US006915331B2

United States Patent
Fuller et al.

(10) Patent No.: US 6,915,331 B2
(45) Date of Patent: Jul. 5, 2005

(54) END USER CONTROL OF A TELECONFERENCING NETWORK THROUGH A DATA NETWORK

(75) Inventors: Brandon Fuller, Longmont, CO (US); Darin Dunlap, San Francisco, CA (US); Wayne Fenton, Sunnyvale, CA (US); Glenn Hahn, Menlo Park, CA (US); Bart Narter, Redwood City, CA (US); Jeff Ou, San Francisco, CA (US); Wesley Yu, Berkeley, CA (US); David Bieselin, Menlo Park, CA (US)

(73) Assignee: Cisco Managed Solutions, Inc., San Jose, CA (US)

( * ) Notice: Subject to any disclaimer, the term of this patent is extended or adjusted under 35 U.S.C. 154(b) by 189 days.

(21) Appl. No.: 10/150,312

(22) Filed: May 16, 2002

(65) Prior Publication Data

US 2003/0235277 A1 Dec. 25, 2003

(51) Int. Cl.[7] .............................................. G06F 13/00
(52) U.S. Cl. ..................................................... 709/204
(58) Field of Search .................. 370/259, 260, 370/261; 379/93.21, 158, 202.01, 202.05; 709/200, 203, 204

(56) References Cited

U.S. PATENT DOCUMENTS 4,796,293 A * 1/1989 Blinken et al. ........ 379/202.01
5,973,724 A    10/1999 Riddle

* cited by examiner

Primary Examiner—Robert B. Harrell
(74) Attorney, Agent, or Firm—Blakely, Sokoloff, Taylor & Zafman LLP

(57) ABSTRACT

A user connected to a data network controls a parallel teleconference network by sending requests through the data network. The requests are validated against permissions granted to the user and an action associated with a request is performed at the teleconferencing network if the request is validated. A status for a teleconference hosted by the teleconferencing network may be sent when the action is performed or when other changes occur during the teleconference. A voice message also may be sent to a user that is affected by the action. In one aspect, the allowed actions are presented to the user through the data network. In another aspect, a graphical user interface for controlling the teleconferencing network is presented to the user through the data network.

65 Claims, 7 Drawing Sheets

END USER CONTROL OF A TELECONFERENCING NETWORK THROUGH A DATA NETWORK

FIELD OF THE INVENTION

This invention relates generally to teleconferencing networks, and more particularly to end user control of a teleconferencing network through a data network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Latitude Communications, Inc., All Rights Reserved.

BACKGROUND OF THE INVENTION

A participant in a voice teleconferencing session generally may control his/her participation in the session by pressing key combinations on the telephone key pad, which sends DTMF signals to a conference controller. Alternatively, a menu of available options for the teleconference may be presented on a workstation connected to a data network. When the participant selects one of the options, a data network server sends signals equivalent to the corresponding DTMF signals to the conference controller. However, generally an end user is able to affect only his/her own participation in the conference and is unable to assert control over other participants.

SUMMARY OF THE INVENTION

A user connected to a data network controls a parallel teleconference network by sending requests through the data network. The requests are validated against permissions granted to the user and an action associated with a request is performed at the teleconferencing network if the request is validated. A status for a teleconference hosted by the teleconferencing network may be sent when the action is performed or when other changes occur during the teleconference. A voice and/or data message also may be sent to the user(s) that are affected by the action. In one aspect, the allowed actions are presented to the user through the data network. In another aspect, a graphical user interface for controlling the teleconferencing network is presented to the user through the data network.

The present invention describes systems, clients, servers, methods, and machine-readable media of varying scope. In addition to the aspects of the present invention described in this summary, further aspects of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an exemplary embodiment of the invention is described by reference to FIG. 1A, which illustrates a teleconferencing system 100 consisting of a teleconferencing network server 101 and a data network server 109. The teleconferencing network server 101 controls a voice network for a teleconference session and a parallel data-based conference, such as may be conducted over the World Wide Web. The data network server 109 and the teleconferencing network server 101 may be connected through directly or through a standard computer network topology, such as a local or wide-area network, operating in accordance any communication protocol, and through any communications medium.

The data network server 109 is coupled to one or more client systems, illustrated generally as data network client 111, using any standard computer network, protocol and medium. A teleconference participant (user) receives and sends information for the parallel data conference through the client 111 using, for example, a graphical user interface. When the parallel data conference is web-based, the graphical user interface may implemented as web pages sent from the data server 109 for presentation to the user through a web browser executing on the client 111.

Figure 1A:
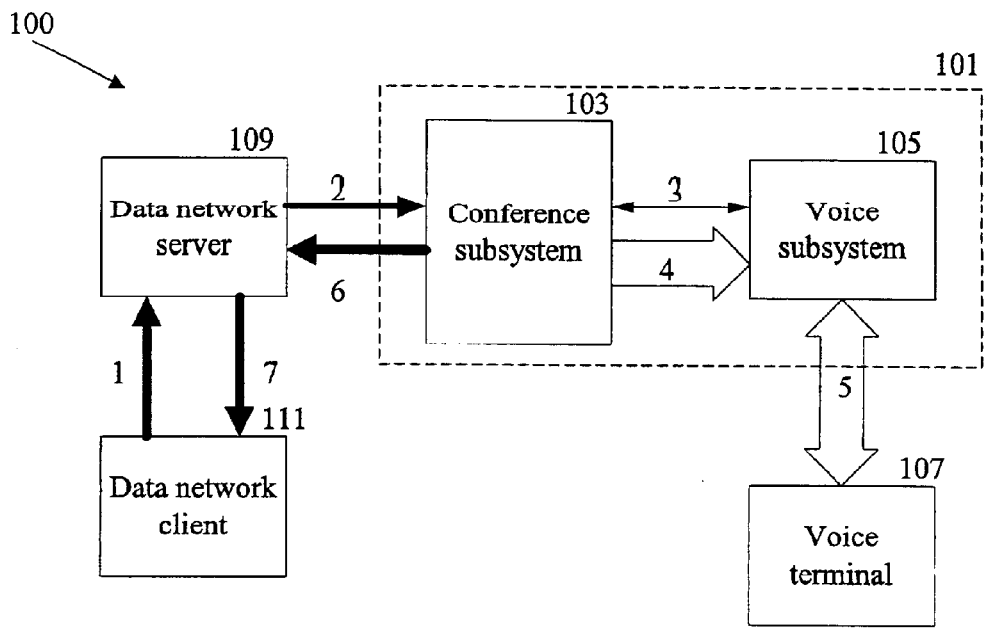
FIG. 1A is a diagram illustrating a system-level overview of an embodiment of the invention.

In the embodiment illustrated in FIG. 1A, the teleconferencing network server 101 comprises a conference subsystem 103 and a voice subsystem 105. The voice subsystem 105 controls the operation of the voice network, illustrated generally as voice terminal 107, during a teleconferencing session. The voice subsystem 105 may be a telephone switch for a PBX (private branch exchange) or PSTN (public switched telephone network) voice network. The voice terminal 107 may be a standard telephone set or one with voice-over-IP capability that is connected into the voice subsystem 105 through the Internet. When a user at the data network client 111 wishes to control or change the operation of the current teleconferencing session, the conference subsystem 103 receives the user input from the data network server 109 and sends the appropriate control signals to the voice subsystem 105. The conference subsystem 103 is also responsible for setting up and monitoring a teleconference session through the voice subsystem 103.

The control actions available to all users include temporarily muting, and subsequently un-muting, oneself. When breakout sessions are available, the user may move to a voice breakout room, and optionally a data breakout room. Actions affecting other teleconference participants are restricted to certain users, such as muting the person who is currently talking in the teleconference, muting other people in the teleconference, permanently changing the speaking ability of someone in the teleconference, or renaming a participant. Additional restricted actions include ejecting someone from the teleconference session and the parallel data session, locking the teleconference session, and optionally the parallel data session, from entry by new users, and setting up the teleconference, such as by calling individual people or by instructing the conference subsystem 104 call a set of people.

An operation, the data network client 111 receives user input and forwards the input in a message to the data network server 109 as illustrated by arrow 1. If the input is a control action that is restricted, the data network server 109 verifies that the particular user has the appropriate level of permission for the action. In one embodiment, the user's permission levels are stored in a user profile created when the user registers for a teleconference session. Assuming the user is permitted to request the action, the data network server 109 sends a request message to the conference subsystem 103 as illustrated by arrow 2. In an alternate embodiment, the user profiles are stored on the conference subsystem 103 and server 109 sends the input to the conference subsystem 103 for validation.

The conference subsystem 103 evaluates the request message and sends the corresponding control signal to the voice subsystem 105 as illustrated by arrow 3. The conference subsystem 103 may also send a message to the voice terminal 107 through the voice subsystem 105 as illustrated by arrows 4 and 5.

The conference subsystem 103 also receives control information from the voice subsystem 105 through the connection illustrated as arrow 3, which enables the conference subsystem 103 to update the status of the teleconference session at the data network client 111 interface. In particular, the conference subsystem 103 informs the data network server 109 of the current speaker(s) so that information can be presented to the user.

Figure 1B:
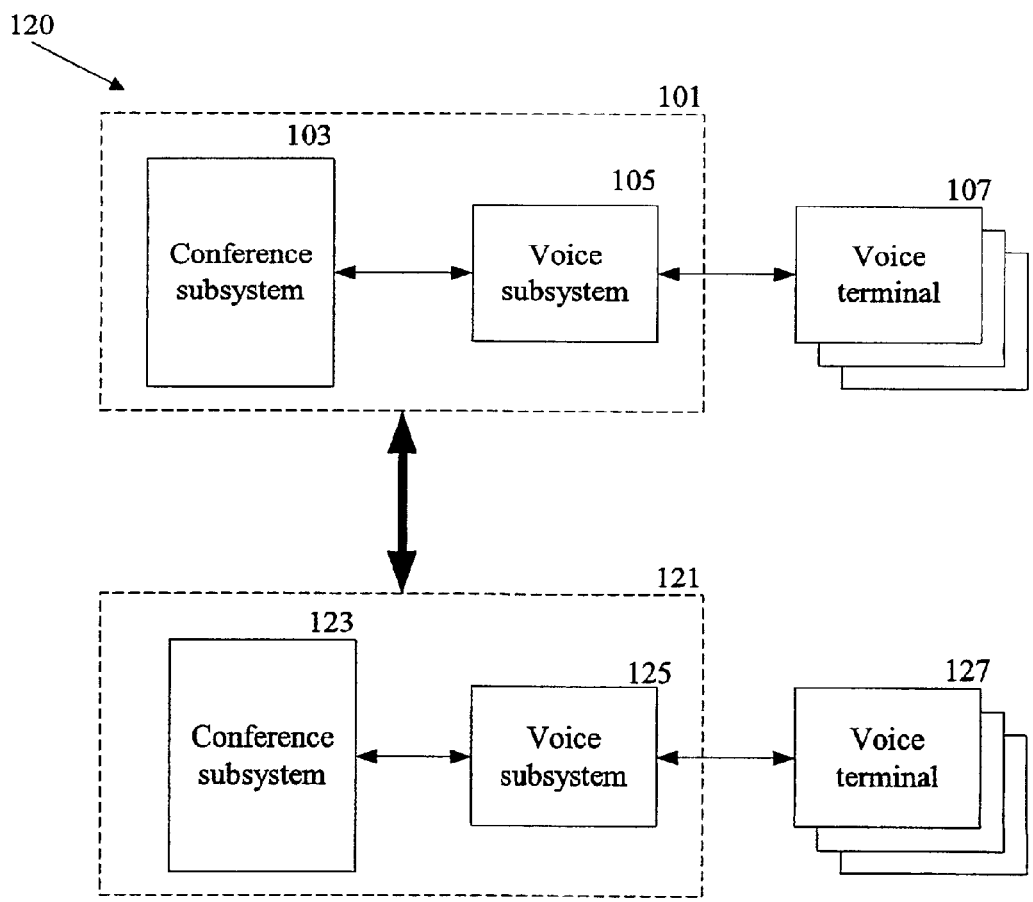
FIG. 1B is a diagram illustration remote connections for the embodiment of FIG. 1A.

When a teleconference spans great distances, such as multiple countries, two or more teleconferencing network servers may be connected together as illustrated in FIG. 1B. Teleconferencing network server 101 controls the voice terminals 107 in one region while teleconferencing network server 121 controls the voice terminals 127 in a different region. Typically, the teleconference network server in the conference scheduler's region would initiate a call to the other teleconference network server(s) to set up the teleconference. Each participant is connected to the teleconferencing network server nearest them. For example, if the teleconferencing network server 101 is located in New York and the server 121 is located in London, the participants in the United States and those in the United Kingdom can hold a joint teleconference that requires only a single transatlantic connection between the servers 101, 121. Assuming the data network is a wide-area network, such as the Internet, a single data network server can control the data network clients in both countries, sending and receiving messages to/from the teleconference network servers 101, 121 as appropriate.

While a system level overview of the operation of an exemplary embodiment of the invention has been described, the inventions is not limited to the particular arrangement of components illustrated. For example, the conference subsystem 103 and the voice subsystem 105 has been shown and described as separate components for ease in explanation, but one of skill in the art will immediately appreciate that their functions may be embodied in a single component. Further details of the operation of a particular teleconferencing network server may be found in U.S. Pat. Ser. Nos. 5,559,875, 5,619,555 and 5,668,863, all assigned to the same assignee as the present application.

Next, the particular methods of the invention are described in terms of computer software with reference to a series of flowcharts. The methods to be performed by a computer constitute computer programs made up of computer-executable instructions illustrated as blocks (acts). Describing the methods by reference to a flowchart enables one skilled in the art to develop such programs including such instructions to carry out the methods on suitably configured computers (the processing unit of the computer executing the instructions from computer-readable media) acting as clients or servers in accordance with the invention. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result.

Figure 2A:
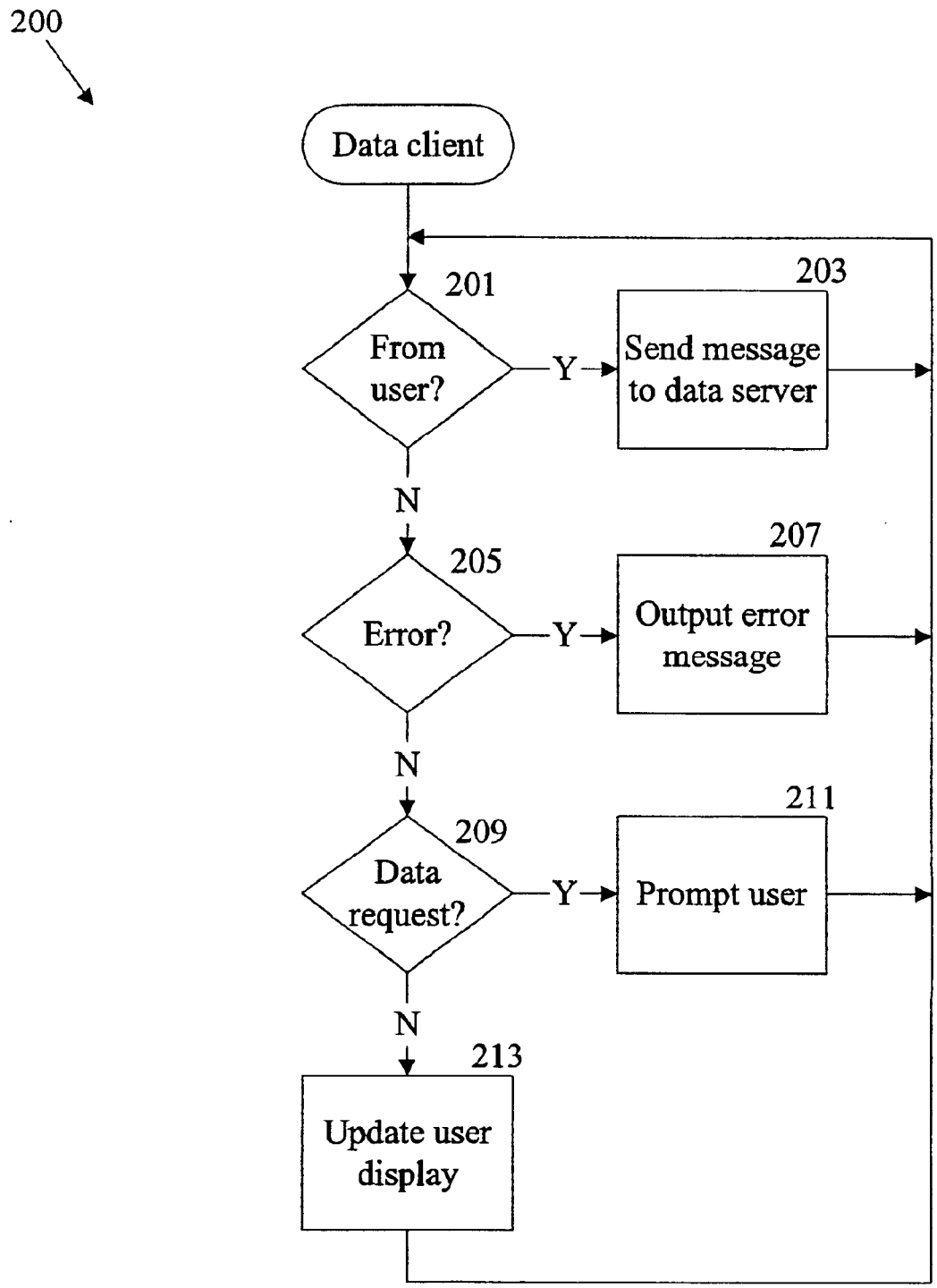
FIG. 2A is a flowchart of a method to be performed by a data network client according to an embodiment of the invention.
Figure 2B:
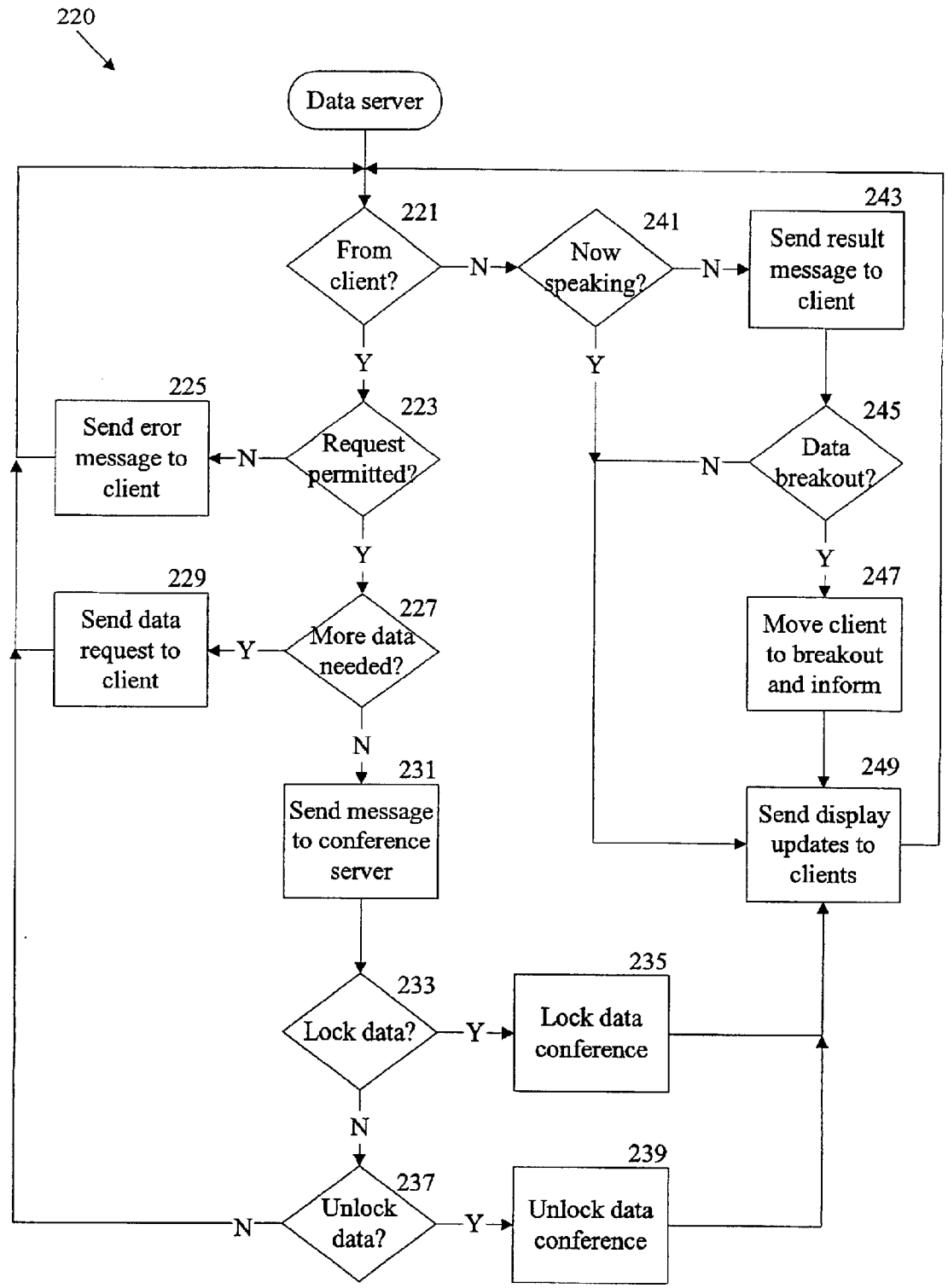
FIG. 2B is a flowchart of a method to be performed by a data network server according to an embodiment of the invention.
Figure 2C:
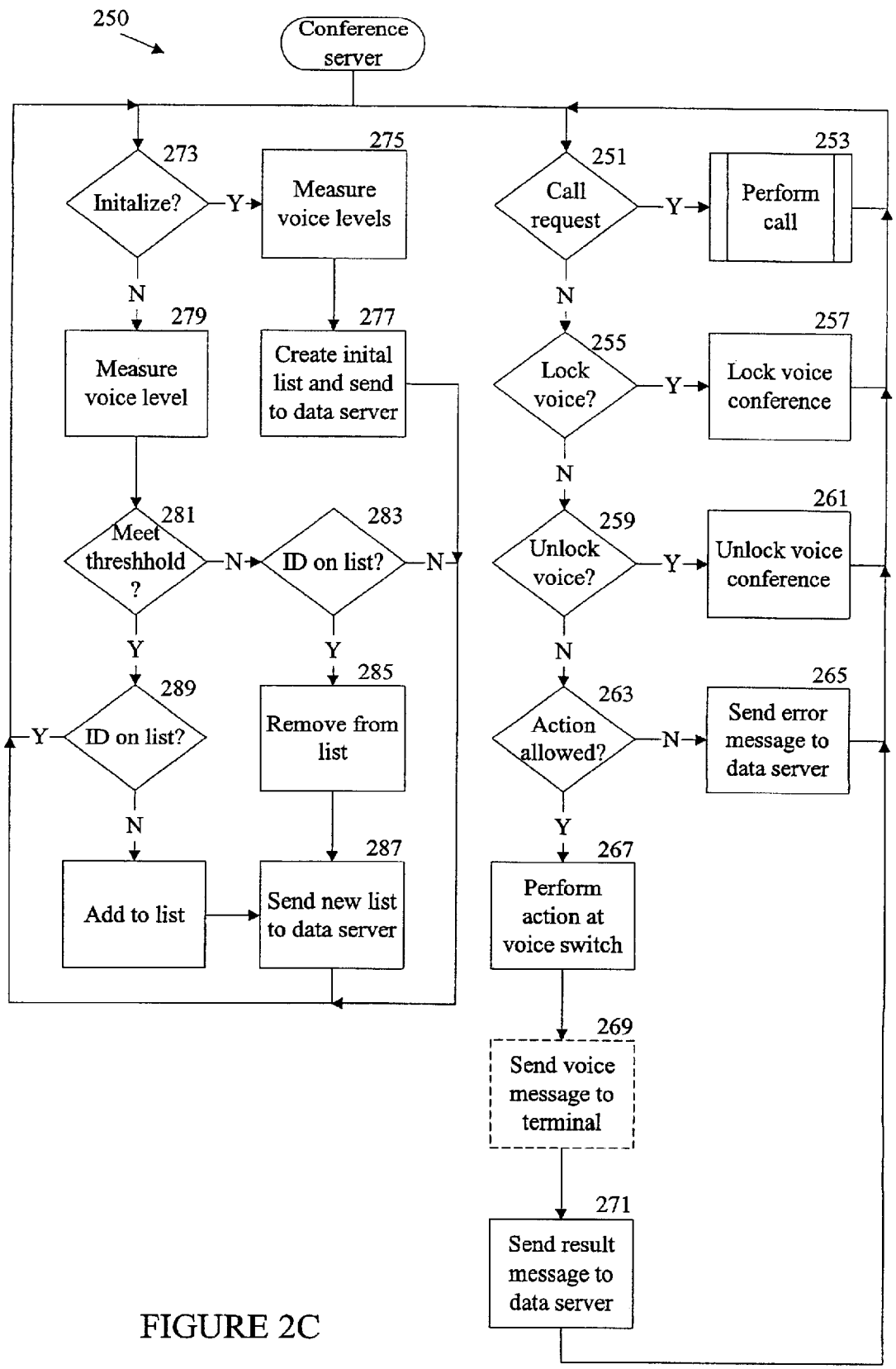
FIGS. 2C–D are flowcharts of methods to be performed by a teleconferencing network server according to an embodiment of the invention.
Figure 2D:
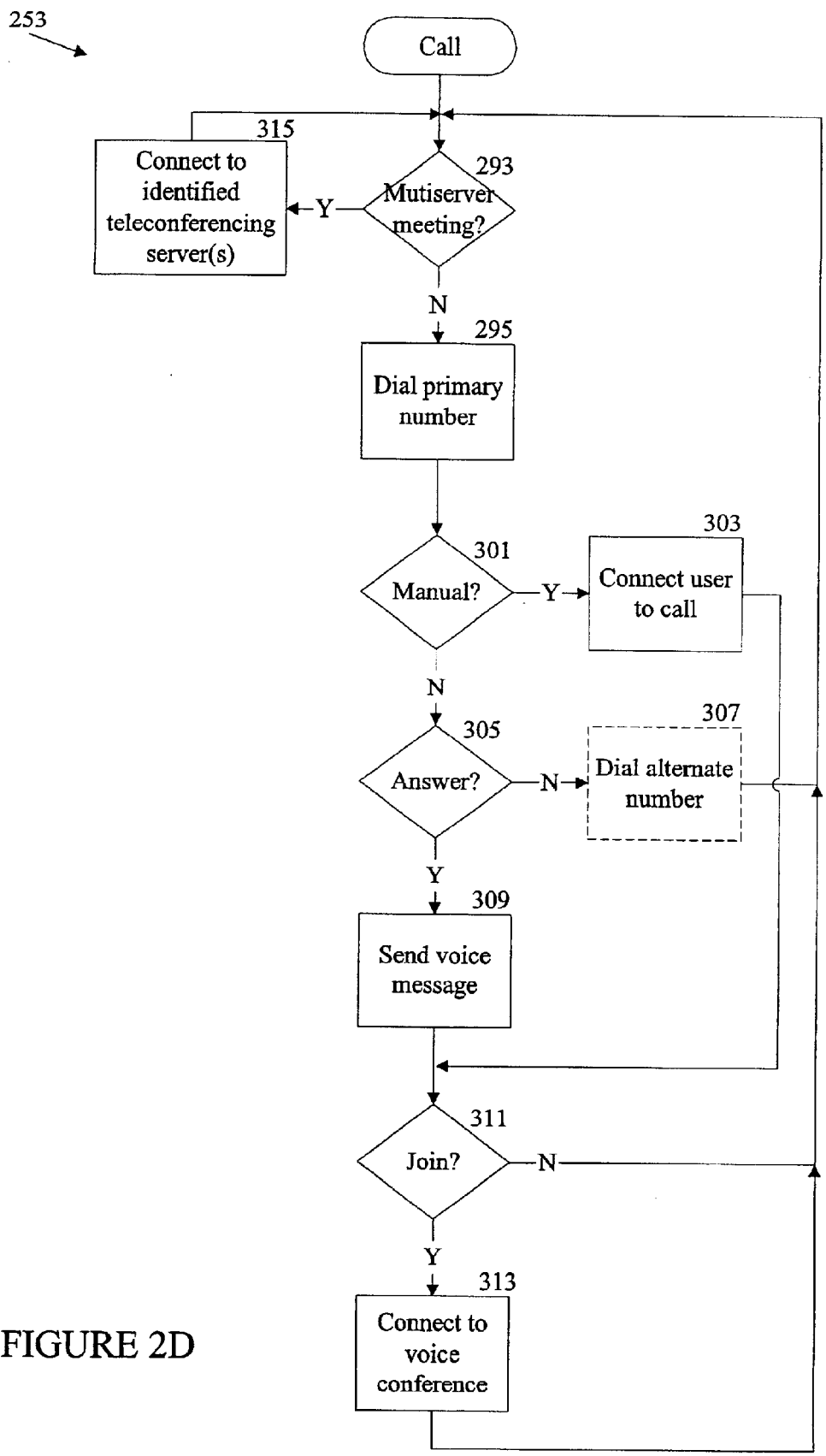

The method performed by the data network client 111 is illustrated in FIG. 2A and the method performed by the data network server 109 is illustrated in FIG. 2B. Two flowcharts in FIGS. 2C–D illustrated the methods performed by the teleconference network server 101 and include the functions described above for the conference subsystem 103 and for the voice subsystem 105. The methods executed by the data network client and data network server are described in terms of a web-based data conference but are equally applicable to other types of data sessions that parallel teleconference sessions. Furthermore, the methods are described as exchanging data in messages but no particular message protocol is implied or required.

Referring first to FIG. 2A, a data client method 200 is executed by a data client upon receipt of input from the user or a message from the data server (block 201). User input is formatted into a message and sent to the data server (block 203) where it is processed as described below in conjunction with FIG. 2B.

When the user requests an action be performed on another participant, the user selects the participant, which sends an identifier for the participant to the data server at block 203. In response, the data server may return an error message if the user does not have permission to perform any action on another person (block 205), or a list specifying the actions permitted to the user (block 209). The method 200 outputs any error message to the user at block 207. The permitted actions are output as web page menu or tool bar at block 211 and the user is prompted to for a selection.

In one embodiment, the user is assigned a permission level based on the type of the user. For example, a user who is not profiled ("guest") is only allowed to mute/unmute himself/herself, while a profiled user is allowed to temporarily mute others as well. The ability to mute the participant who is currently speaking enables a user to avoid having to listen to extraneous conversations, "music-on-hold," and noise on the line of the other person. Furthermore, allowing a user to control other participants relieves the presenter of the responsibility of moderating the teleconference during the presentation. In addition to changing the speaking ability of other participants, the scheduler of the teleconference is allowed permanently change the speaking ability of participants and to eject a participant from the voice and data sessions when necessary.

Additional error messages result from the user attempting to enter a locked voice or data conference. The method 200 may also subsequently prompt the user at block 211 for other information, such as a telephone number required to call an invitee not currently participating in the teleconference session. Messages regarding the status of the teleconference update the portions of the client's web page, such as tool bars, menus, and participant list (block 213). Various visual indicators maybe used to indicate the current characteristics and status of each participant, such as name, speaking ability (e.g., temporarily or permanently muted), participation (e.g., voice-only conference, data-only conference, voice/data breakout room, ejected), current speaker, etc. In another embodiment, all invitees to the teleconference are listed and marked as participating or not.

A data server method 220 shown in FIG. 2B executes on a server controlling a data network providing a parallel data conference session, such as the data network server 109 in FIG. 1A. The method 220 receives messages from the data client method 200 and from methods executing on the teleconference network server 101 that are described in conjunction in FIGS. 2C–D below. When a message is received, the data server method 220 determines if the message is from a data client (block 221). If so, the method 220 determines if the request is permitted (block 223). For example, if the user is attempting to join a locked conference, the request will be denied. The processing at block 223 includes checking the user's permissions if the request affects another person, such as when the message contains a participant identifier or a call request to an individual, team, or missing conference invitees. The method 220 sends an error message to the data client method at block 225 if the request is not permitted.

Permitted actions are processed at block 227 to determine if more data is needed, such as, for example, a call request that requires a phone number. Assuming no additional data is needed, a message is sent to the conference server containing the requested action and any required data at block 231, where it is processed as described further below. Additional data is requested through a web page created by the data server method 220 and sent to the data client for presentation to the user at block 229. If the message from the client method 200 specifies a participant identifier, the method 220 formats a web page at block 229 that contains the actions permitted to the user according to the profile and sends the selected action and participant identifier returned by the data client to the teleconference network server at block 231.

The data server method 220 also locks and unlocks a parallel data conference session as illustrated at blocks 233 until 239. The voice conference may be locked/unlocked in conjunction with locking/unlocking the data conference as described below with reference to FIG. 2C. A web page showing the updated status of the data conference session is sent to all data clients participating in the particular data conference session at block 249.

If the message received by the data server method 220 is from the teleconference network server, the data server method 220 determines if the message is a "now speaking" message containing a list of speakers in the voice conference (block 241). If not, the message is a result message that provides a status of the user's last request and a web page containing the updated status is sent to the data client at block 243. If the user's original request was to move to a voice breakout room and a data breakout room (block 245), the data server method 220 moves the client to the requested data breakout room and informs the affected data client of the change at block 247. The data clients for the other conference participants are sent updated web pages at block 249.

Returning to block 241, if the message is a "now speaking" message, the list of speakers has changed and the change is reflected in an updated web page sent to the data clients at block 249.

The functions performed by the conference subsystem and the voice subsystem are illustrated as a single conference method 250 in FIG. 2C, which utilizes a supporting voice conference call method 253 in FIG. 2D. The conference server method 250 consists of two parallel threads of processing. In one thread, illustrated as blocks 251 until 271, the method 250 processes messages from the data server method 220. The other thread, illustrated as block 273 until 291, monitors a voice conference to determine which participants are speaking.

Upon receipt of a message from the data server method 220, the method 250 determines the type of request at blocks 251, 255 and 259. Call requests are processed by the supporting call method 253 (block 253). Locking or unlocking a voice conference is accomplished at blocks 257 and 261, respectively, and may be performed in concert with the locking of the parallel data conference as previously described in conjunction with FIG. 2B. The method 250 evaluates other requests are evaluated at block 263 to determine if the action requested is allowed, i.e. the user may be attempting to join a locked voice conference. An error message is sent to the data server at block 265 if the action is not allowed for subsequent delivery to the user as previously described in FIGS. 2A and 2B. Allowed actions are performed at block 267, and a result message is sent to the data server method 220 at block 271. An optional voice message may sent to the voice terminal (block 269, shown in phantom) to audibly inform the user of the change, i.e., muted, unmuted, etc. It will be appreciated that the actions at block 267 that affect the operations of the voice terminals are performed by the components of the teleconferencing network server that controls the voice conference.

Turning now to FIG. 2D, the supporting call method 253 performed by the conference server method 250 is described. The call method 253 may be incorporated into a prior art process that sets up teleconferences or may be implemented as a separate procedure. The embodiment of the call method 253 illustrated in FIG. 2D enables one teleconferencing network server to communicate with other teleconferencing network servers to set up a teleconference, as well as providing support for various call commands requested by the user.

The call method 253 determines if the user is initiating a multiserver meeting (block 293) and, if so, sets up a multiserver meeting as described below in conjunction with block 315. Otherwise, the method 253 dials the primary number for the specified participant(s) at block 295. If the call is a manual call in which the user wants to talk the other person (block 301), the conference server connects the user to the line (block 303). Subsequently, the called person may elect to join the conference at block 311.

For an automatic call request, the conference server determines if there is an answer for each of the people called (block 305) and may optionally dial an alternate number if there is no answer (block 307, shown in phantom). If there is an answer, the method 253 plays a voice message for the person that instructs them to press certain buttons on the voice terminal to join or decline to join the conference. If the user elects to join the conference at block 311, the corresponding voice line is connected into the conference (block 313). In an alternate embodiment, the caller may also talk to the people called, if desired, before the voice message is played.

Turning now to block 315, a call request for a multiserver meeting includes one or more teleconferencing network server identifiers associated with invitees that connect to servers other than the initiating teleconferencing network server, i.e., the server for the user initiating the meeting. At block 315, the method 253 connects the identified teleconferencing network servers to the initiating teleconferencing network server. It will be appreciated that the processing represented by block 315 includes the operations necessary to couple the teleconferencing network servers through a voice connection and one of skill in the art will understand the required operations without additional explanation. It will also be appreciated that FIG. 2D implies no particular order in which the servers and the participants are connected into the multiserver teleconference.

Returning to FIG. 2C, the processes performed by the conference server method 250 to monitor the voice levels during the voice conference is now described. At conference initialization (block 237), the method 250 measures the voice levels of the participants in the voice conference (block 275) and creates an initial list of current speakers (as opposed to those who have the ability to speak), i.e. participants whose voice levels exceed a threshold value (block 277). The list of speakers is sent to the data server method 220 at block 277. In one embodiment, the list may show multiple current speakers, with the number of speakers determined by system options or defaults. The conference server continues to measure the voice levels during the conference to update the list of speakers (block 279). If a voice signal meets the threshold (block 281) and the corresponding participant is not currently on the list of speakers (block 289), the method 250 adds the participant's identifier to the list at block 291 and sends the new list to the data server method 220 at block 287, which updates the data clients for the users that are participating in the voice conference as previously described. If a voice signal for a participant that is currently on the list falls below the threshold (block 283), the participant's identifier is removed from the list at block 285 and the new list is sent at block 287.

The particular methods performed by an embodiment of the invention have been described. It will be appreciated that more or fewer processes may be incorporated into the methods illustrated in FIGS. 2A–D without departing from the scope of the invention and that no particular order is implied by the arrangement of blocks shown and described herein. Furthermore, it will be appreciated that the functions previously described may be divided among the clients and servers in combinations other than those illustrated and that such alternate combinations are contemplated as within the scope of the invention.

Figure 3A:
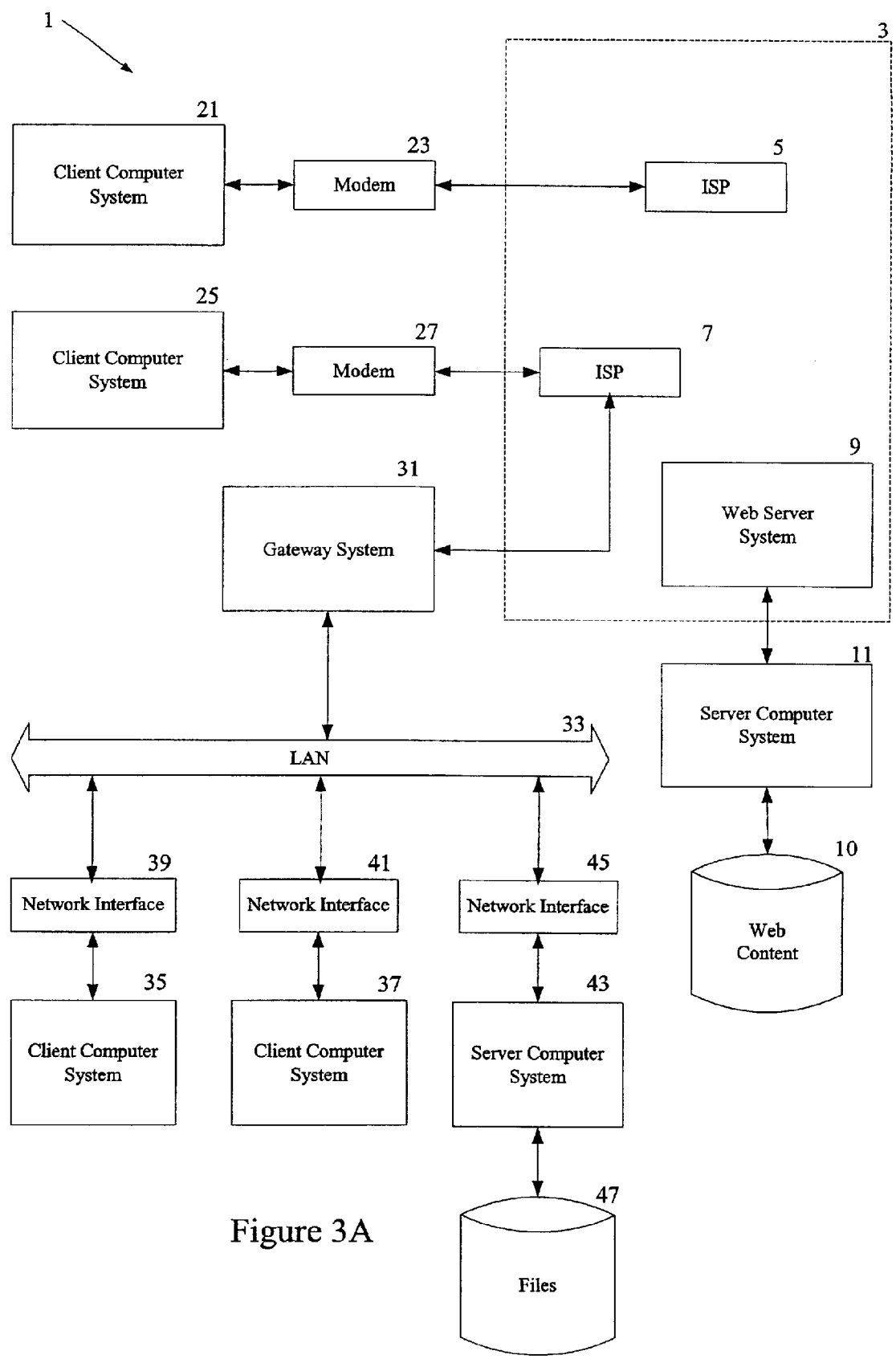
FIG. 3A is a diagram of one embodiment of an operating environment suitable for practicing the present invention.
Figure 3B:
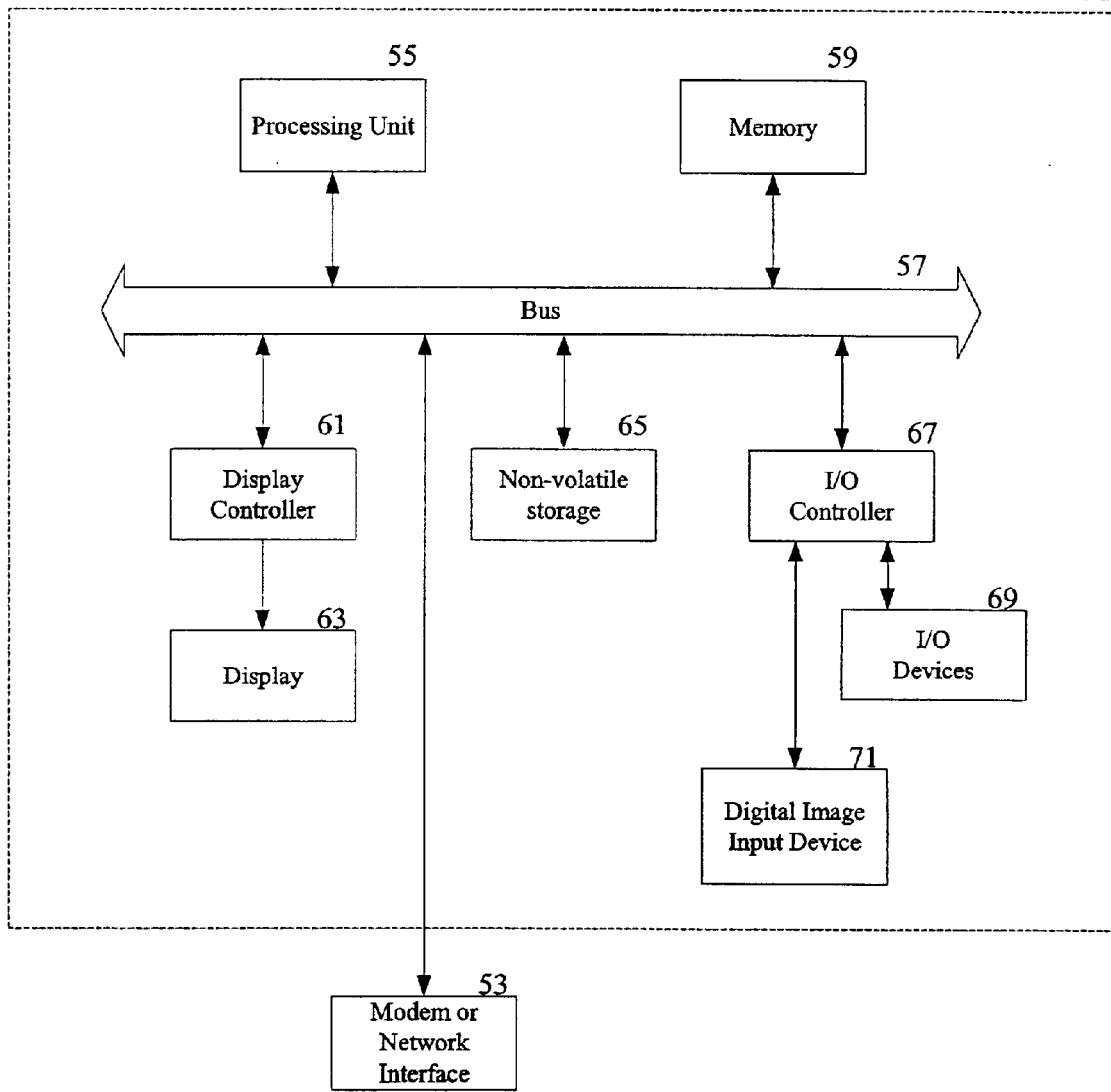
FIG. 3B is a diagram of one embodiment of a computer system suitable for use in the operating environment of FIG. 3A.

The following description of FIGS. 3A–B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 3A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7.Users on client systems, such as client computer systems 21, 25, 35, and 37 obtain access to the Internet through the Internet service providers, such as ISPs 5 and 7.Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 3A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, or other such computer system. Similarly, the ISP 7 provides Internet connectivity for client systems 25, 35, and 37, although as shown in FIG. 3A, the connections are not the same for these three computer systems. Client computer system 25 is coupled through a modem interface 27 while client computer systems 35 and 37 are part of a LAN. While FIG. 3A shows the interfaces 23 and 27 as generically as a "modem," it will be appreciated that each of these interfaces can be an analog modem, ISDN modem, cable modem, satellite transmission interface (e.g. "Direct PC"), or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 3B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the terms "computer-readable medium" and "machine-readable medium" include any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used as data clients in accordance with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 3B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

A teleconferencing system has been described in which a voice conference session can be controlled by a user though a parallel data conference session. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to voice and data networks is meant to include all of such environments. Therefore, it is manifestly intended that this invention be limited only by the following claims and equivalents thereof.

What is claimed is:

1. A computerized method comprising:

receiving, from an end user through a data network, an identifier for a participant in a teleconference hosted by a teleconferencing network, wherein each one of a plurality of participants in the teleconference is eligible to be the end user at any time;

presenting, to the end user through the data network, a choice of actions allowed by a permission level associated with the end user;

receiving, from the end user through the data network, a chosen action; and changing, at the teleconferencing network, a characteristic of the participant in accordance with the chosen action.

2. The computerized method of claim 1 further comprising:
  sending, to the end user through the data network, a status for the teleconference.

3. The computerized method of claim 2, wherein the status is selected from the group consisting of a current speaker, participants, invitees, participant status, a breakout room status, and a conference lock status.

4. The computerized method of claim 3, wherein the participant status is selected from the group consisting of speaking, muted, permanently muted, voice only, data only, and voice and data.

5. The computerized method of claim 3 further comprising:
  monitoring the teleconferencing network to determine the current speaker.

6. The computerized method of claim 1 further comprising:
  sending a message to the participant that is affected by the chosen action.

7. The computerized method of claim 6, wherein the message is sent through the data network.

8. The computerized method of claim 6, wherein the message is sent through the telecommunications network.

9. The computerized method of claim 1, wherein the permission level is based on a type associated with the end user.

10. The computerized method of claim 9, wherein the type is selected from the group consisting of guest, profiled user, and conference scheduler.

11. The computerized method of claim 1, wherein the data network presents a graphical user interface to the end user to control the teleconferencing network.

12. The computerized method of claim 11, wherein the graphical user interface is browser-based.

13. The computerized method of claim 1 further comprising:
  receiving, from the end user through the data network, an initiation request for the teleconference, the request comprising a plurality of invitees to the teleconference; and
  connecting, by the teleconferencing network, the plurality of invitees to the teleconference if allowed by the permission level of the end user.

14. The computerized method of claim 13, wherein at least one of the invitees is connectable through a different teleconferencing network and further comprising:
  connecting, by the teleconferencing network, the different teleconferencing network to the teleconference.

15. The computerized method of claim 1 further comprising:
  sending, to the end user through the data network, an error indicator if no actions are allowed by the permission level.

16. The computerized method of claim 1, wherein the characteristic is selected from the group consisting of speaking ability, participation, and name.

17. The computerized method of claim 1, wherein the identifier is for a current speaker.

18. The computerized method of claim 1 further comprising:
  receiving, from the end user through the data network, a request to change a characteristic of the end user; and
  changing, at the teleconferencing network, the characteristic of the end user in accordance with the request.

19. The computerized method of claim 1, wherein the data network is a public wide area network.

20. The computerized method of claim 1, wherein the data network is virtual private network.

21. The computerized method of claim 1, wherein the data network is a local area network.

22. The computerized method of claim 1 further comprising:
  receiving, from the end user through the data network, an identifier for an invitee who is not participating in the teleconference; and
  connecting, by the teleconferencing network, the invitee to the teleconference if the invitee elects to join the teleconference.

23. A machine-readable medium having executable instructions to cause a machine to perform a method comprising:
  receiving, from an end user through a data network, an identifier for a participant in a teleconference hosted by a teleconferencing network, wherein each one of a plurality of participants in the teleconference is eligible to be the end user at any time;
  presenting, to the end user through the data network, a choice of actions allowed by a permission level associated with the end user;
  receiving, from the end user through the data network, a chosen action; and
  changing, at the teleconferencing network, a characteristic of the participant in accordance with the chosen action.

24. The machine-readable medium of claim 23, wherein the method further comprises:
  sending, to the end user through the data network, a status for the teleconference.

25. The machine-readable medium of claim 24, wherein the status is selected from the group consisting of a current speaker, participants, invitees, participant status, a breakout room status, and a conference lock status.

26. The machine-readable medium claim 25, wherein the participant status is selected from the group consisting of speaking, muted, permanently muted, voice only, data only, and voice and data.

27. The machine-readable medium of claim 25, wherein the method further comprises:
  monitoring the teleconferencing network to determine the current speaker.

28. The machine-readable medium of claim 23, wherein the method further comprises:
  sending a message to the participant that is affected by the chosen action.

29. The machine-readable medium of claim 28, wherein the message is sent through the data network.

30. The machine-readable medium of claim 28, wherein the message is sent through the telecommunications network.

31. The machine-readable medium of claim 23, wherein the permission level is based on a type associated with the end user.

32. The machine-readable medium of claim 31, wherein the type is selected from the group consisting of guest, profiled user, and conference scheduler.

33. The machine-readable medium of claim 23, wherein the data network presents a graphical user interface to the end user to control the teleconferencing network.

34. The machine-readable medium of claim 33, wherein the graphical user interface is browser-based.

35. The machine-readable medium of claim 23, wherein the method further comprises:
receiving, from the end user through the data network, an initiation request for the teleconference, the request comprising a plurality of invitees to the teleconference; and
connecting, by the teleconferencing network, the plurality of invitees to the teleconference if allowed by the permission level of the end user.

36. The machine-readable medium of claim 35, wherein at least one of the invitees is connectable through a different teleconferencing network and further comprising:
connecting, by the teleconferencing network, the different teleconferencing network to the teleconference.

37. The machine-readable medium of claim 23, wherein the method further comprises:
sending, to the end user through the data network, an error indicator if no actions are allowed by the permission level.

38. The machine-readable medium of claim 23, wherein the characteristic is selected from the group consisting of speaking ability, participation, and name.

39. The computerize method of claim 23, wherein the identifier is for a current speaker.

40. The machine-readable medium of claim 23, wherein the method further comprises:
receiving, from the end user through the data network, a request to change a characteristic of the end user; and
changing, at the teleconferencing network, the characteristic of the end user in accordance with the request.

41. The machine-readable medium of claim 23, wherein the data network is a public wide area network.

42. The machine-readable medium of claim 23, wherein the data network is virtual private network.

43. The machine-readable medium of claim 23, wherein the data network is a local area network.

44. The machine-readable medium of claim 23, wherein the method further comprises:
receiving, from the end user through the data network, an identifier for an invitee who is not participating in the teleconference; and
connecting, by the teleconferencing network, the invitee to the teleconference if the invitee elects to join the teleconference.

45. A data network server system comprising:
a processor connected to a memory through a bus;
a network interface connected to the processor through the bus to send and receive data to and from an end user and a teleconferencing network server, the end user participating in teleconference hosted by the teleconferencing network server; and
a process executed by the processor from the memory to cause the processor to receive an identifier for a participant in the teleconference from the end user, to present to the end user a choice of actions allowed by a permission level associated with the end user, to receive a chosen action from the end user, and to send the chosen action to the teleconferencing server.

46. The data network server system of claim 45, wherein the process further causes the processor to send an error indicator to the end user if no actions are allowed by the permission level.

47. The data network server system of claim 45, wherein the process further causes the processor to send a status for the teleconference to the end user.

48. The data network server system of claim 45, wherein the process further causes the processor to send a message to the participant affected by the chosen action.

49. The data network server system of claim 45, wherein the process further causes the processor to receive a request to change a characteristics of the end user from the end user, and to send the request to the teleconferencing network server.

50. The data network server system of claim 45, wherein the process further causes the processor to present a graphical user interface to the end user to control the teleconferencing network server.

51. The data network server system of claim 45, wherein the process further causes the processor to receive an initiation request for the teleconference from the end user, the request comprising a plurality of invitees to the teleconference, and to send the request to the teleconferencing network server if allowed by the permission level of the end user.

52. The data network server system of claim 45, wherein the process further causes the processor to receive from the end user an identifier for an invitee who is not participating in the teleconference and to send the identifier to the teleconferencing network server.

53. The teleconferencing network server of claim 52, wherein the process further causes the processor to send a message to the participant that is affected by the chosen action.

54. A teleconferencing network server system comprising:
a processor connected to a memory through a bus;
a network interface connected to the processor through the bus to send and receive data to and from a data network server; and
a process executed by the processor from the memory to cause the processor to receive a chosen action for a participant in a teleconference hosted by the teleconferencing network server and to change a characteristic of the participant in accordance with the chosen action.

55. The teleconferencing network server of claim 54, wherein the process further causes the processor to receive an initiation request for the teleconference, the request comprising a plurality of invitees, and to connect the plurality of invitees to the teleconference.

56. The teleconferencing network server of claim 55, wherein at least one of the invitees is connectable through a different teleconferencing network server and the process further causes the processor to connect the different teleconferencing network server to the teleconference.

57. The teleconferencing network server of claim 54, wherein the process further causes the processor to send a status for the teleconference.

58. The teleconferencing network server of claim 54, wherein the process further causes the processor to receive an identifier for an invitee who is not participating in the teleconference and to connect the invitee to the teleconference if the invitee elects to join the teleconference.

59. An apparatus comprising:
means for receiving data from an end user and from a teleconferencing network, wherein the means for receiving is operable to receive an identifier for a participant in a teleconference and a chosen action from the end user;
means for determining a choice of actions allowed by a permission level associated with the end user; and
means for sending data to the end user and to the teleconferencing network, wherein the means for sending is operable to present the end user the choice of actions, and to send the chosen action to the teleconferencing network to change a characteristic of the participant.

60. The apparatus of claim 59, wherein the means for receiving is further operable to receive a request to change a characteristic of the end user, and the means for sending is further operable to send the request to the teleconferencing network.

61. The apparatus of claim 59, wherein the means for receiving is further operable to receive an initiation request from the end user, the request comprising a plurality of invites to the teleconference, and the means for sending is further operable to send the request to the teleconferencing network if allowed by the permission level of the end user.

62. The apparatus of claim 59, wherein the means for receiving is operable to receive an identifier for an invitee who is not participating in the teleconference from the end user, and the means for sending is operable to send the identifier to the teleconferencing network.

63. An apparatus comprising:
a means for receiving data from a data network, wherein the means for receiving is operable to receive a chosen action from a participant in a teleconference; and
a means for controlling the teleconference, wherein the means for controlling is operable to change a characteristics of the participant in accordance with the chosen action.

64. The apparatus of claim 63, wherein the means for receiving is further operable to receive an initiation request for the teleconference, the request comprising a plurality of invitees, and the means for controlling is further operable to connect the plurality of invitees to the teleconference.

65. The apparatus of claim 63, wherein the means for receiving is further operable to receive an identifier for an invitee who is not participating in the teleconference, and the means for controlling is further operable to connect the invites to the teleconference if the invitee elects to join the teleconference.

* * * * *